Oct. 30, 1951          M. AXELROD          2,572,967

METHOD OF APPLYING DECALCOMANIA DESIGNS TO WRINKLE FINISHES

Filed July 14, 1947

INVENTOR
MAURICE AXELROD
Toulmin & Toulmin
ATTORNEYS

Patented Oct. 30, 1951

2,572,967

UNITED STATES PATENT OFFICE 2,572,967

METHOD OF APPLYING DECALCOMANIA DESIGNS TO WRINKLE FINISHES

Maurice Axelrod, Cleveland, Ohio, assignor to Axelgate Corporation, Dayton, Ohio, a corporation of Delaware Application July 14, 1947, Serial No. 760,854

4 Claims. (Cl. 154—95)

This invention deals with a method of preparing decalcomania transfers for wrinkle finishes and the products obtained thereby.

It is an object of this invention to provide decalcomania transfers or wrinkle textured coatings which adhere especially well.

It is another object of this invention to provide decalcomania transfers or wrinkle textured coatings, the outlines of which follow the contours of the wrinkles of said coatings and which themselves dry to a wrinkle surfaced pattern.

It is still another object of this invention to provide decalcomania transfers on wrinkle textured coatings which have an abrasion resistance equal to or greater than that of the wrinkle coating.

These and other objects are accomplished by first depositing the various layers of the decalcomania in reversed order to a carrier which consists in first applying a layer of abrasion resistant resinous material to said carrier body, a layer containing the pattern intended to be transferred to the wrinkle coating thereover and then a layer of adhesive resinous material; the adhesive layer, which is the top layer on the temporary carrier, is then treated with a solvent and the assembled layers are finally transferred onto the article to be decorated. The compositions used for this process are considered a part of the invention.

As a carrier for the three layers described above, I prefer to use a starch covered paper. It is, however, understood that other carrier materials customary in the art may be used without deviating from the scope of the invention. As the solvent for giving the adhesive layer the sticky consistency required, I prefer to use ethylene glycol monoethyl ether acetate.

For the adhesive layer I preferably use thermoplastic resins of a chain type polymer such as vinyl copolymers, polystryrene resins and polyisobutylene resins. A material which has been found especially suitable, is polyvinyl acetate of a structural formula chain length of 20,000 molecular units. For instance, I used a solution of 3 lbs. of such polyvinyl acetate in 7 lbs. of ethylene glycol monoethyl ether acetate with satisfaction.

The layer which contains the pattern and/or coloring material is based on the same resin as that of the adhesive layer, but contains additional pigment or dye arranged in the pattern desired. Pyroxylin ink may be also used with satisfaction for this purpose. The pattern in the coloring layer may be produced by printing, screening or any other process customary in the art.

The top layer of the final product, which is the layer adjacent the starch covered paper of the temporary carrier, also contains chain type thermoplastic resins as the predominant ingredient; but, in order to increase the abrasion resistance of this layer, approximately 10 per cent nitrocellulose is added. It is preferably transparent in order to make the pattern of the intermediate layer visible.

After the thus assembled layers have been transferred to the surface to be decorated by moistening the adhesive layer, applying the assembly to the article and peeling off the carrier, the coated article is dried. This step may be carried out either by just allowing the coating to airdry, or by exposing it to infrared light for approximately 10 minutes, or by applying an air blast of about 300° F. for approximately 10 minutes or by any other method known in the art. The times and temperatures are given only by way of example and may be modified according to conditions prevailing.

Ornaments, prints, or the like prepared by the method just described, are characterized by a wrinkle formation that has substantially the same texture as the wrinkle of the base coating. These transferred decorations adhere excellently to the wrinkle coating of the article, in fact form an integral part thereof; they also thus are very durable.

The invention will be more fully understood from the following description taken in connection with the accompanying drawings, in which Figure 1 is a cross-sectional view of a temporary carrier having a coating with the intended pattern thereon;

Figure 1:
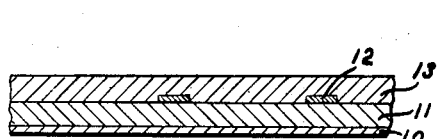

Referring to the drawings in detail and particularly to Figure 1, the reference numeral 10 indicates a carrier to which the layers forming the pattern to be transferred are applied in reversed order. Thus, the layer indicated by 11 consists of a resinous material of relatively great abrasion resistance and is to form the top layer on the article. The reference numeral 12 indicates the print, decoration, design or whatever is the pattern to be applied to the surface of the article; in the instance illustrated this design consists of the letter A. On top of the design layer proper there is applied a layer 13 which consists of an adhesive resin composition.

Figure 2:
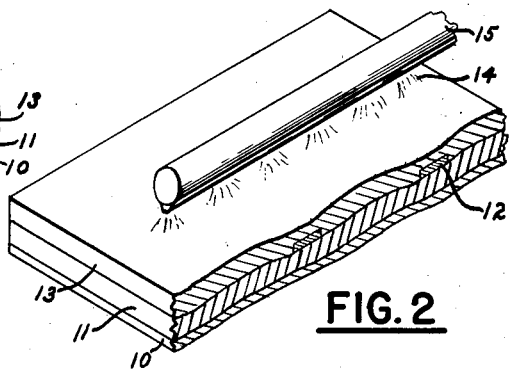
Figure 2 is a fragmentary perspective view of the assembly shown in Figure 1 but showing it while it is being prepared for application to the article to be coated.
Figure 3:
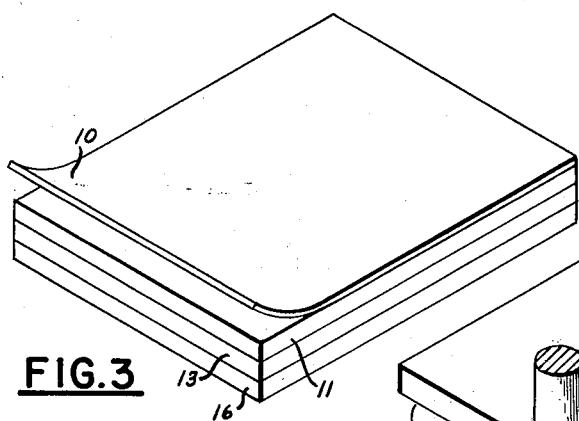
Figure 3 is a perspective view of the same assembly as applied to the article to be coated and during removal of the temporary carrier.
Figure 6:
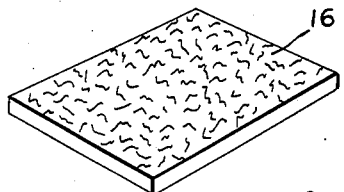
Figure 6 is a perspective view illustrating the wrinkle surface of the article to be coated.
Figure 4:
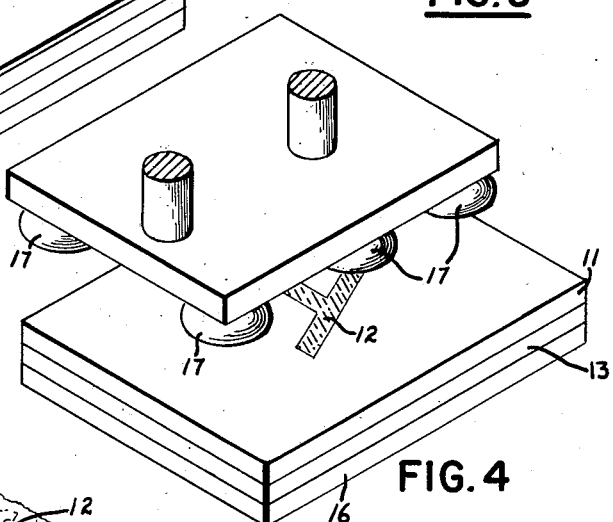
Figure 4 is a perspective view of the article with the coating thereon during the process of drying.

After these layers have been applied to the temporary carrier, the layer 13 is moistened with a solvent as indicated in Figure 2. There a dispenser pipe 15 sprays a solvent 14 onto the surface of the layer 13. Immediately upon moistening, the assembly is placed on the surface to be decorated with the adhesive layer adjacent the surface of the article 16. Thereafter the temporary carrier 10 is peeled off the layers (Figure 3), and the layers are dried, for instance by means of infra-red lamps 17 (Figure 4).

Figure 5:
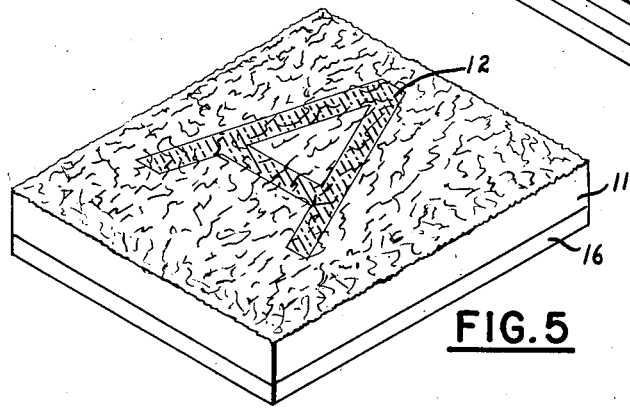
Figure 5 is a perspective view of the finished article.

Figure 5 shows the finished article with the coating thereon. It will be seen that the letter A has the same type of wrinkle texture as the remaining surface. Consequently the general character of the wrinkle texture surface is not spoiled by the design applied by the process of my invention. The surface of the coating has a high abrasion resistance and the adherence of the coating is excellent so that peeling of the various layers does not occur. Consequently the coatings of this invention are characterized by great durability.

It will be understood that while there have been described herein certain specific embodiments of my invention, it is not intended thereby to have the invention limited to the specific details given in view of the fact that the invention is susceptible to various modifications and changes which come within the spirit of the disclosure and the scope of the appended claims.

I claim:

1. In a method of affixing patterns to articles having a wrinkle coated surface, the steps of applying to a temporary carrier a layer consisting of a mixture of a chain type thermoplastic resin and nitrocellulose; superposing a layer containing the desired pattern; depositing a thermoplastic layer having adhesive properties thereover; applying solvent to the thermoplastic resin layer to render the resin tacky; adhering the assembly to the surface to be decorated with the said adhesive layer in contact with the said surface; removing said temporary carrier from the other layers of said assembly; and heating the deposited assembly and article to secure intimate adhesion therebetween whereby the said assembly assumes the texture of said wrinkle surface and becomes substantially integral with said article.

2. In a method of affixing patterns to articles having a wrinkle coated surface, the steps of applying to a temporary carrier a layer consisting of a mixture of a chain type thermoplastic resin and 10 percent nitrocellulose; superposing a layer containing the desired pattern; depositing a thermoplastic layer having adhesive properties thereover; applying solvent to the thermoplastic resin layer to render the resin tacky; adhering the assembly to the surface to be decorated with the said adhesive layer in contact with the said surface; removing said temporary carrier from the other layers of said assembly; and heating the deposited assembly and article to secure intimate adhesion therebetween whereby the said assembly assumes the texture of said wrinkle surface and becomes substantially integral with said article.

3. In a method of affixing patterns to articles having a wrinkle coated surface, the steps of applying to a temporary carrier a layer consisting of a mixture of a chain type thermoplastic resin and 10 percent nitrocellulose; superposing a layer containing the desired pattern; depositing a layer of polyvinyl acetate thereover; applying solvent to the thermoplastic resin layer to render the resin tacky; adhering the assembly to the surface to be decorated with the said adhesive layer in contact with the said surface; removing said temporary carrier from the other layers of said assembly; and heating the deposited assembly and article to secure intimate adhesion therebetween whereby the said assembly assumes the texture of said wrinkle surface and becomes substantially integral with said article.

4. In a method of affixing patterns to articles having a wrinkle coated surface, the steps of applying to a temporary carrier a layer consisting of a mixture of a chain type thermoplastic resin and 10 percent nitrocellulose; superposing a layer containing the desired pattern, depositing a layer of material consisting of a mixture of 3 pounds of polyvinyl acetate and 7 pounds of ethylene glycol monoethyl ether acetate; applying solvent to the thermoplastic resin layer to render the resin tacky, adhering the assembly to the surface to be decorated with the said adhesive layer in contact with the said surface; removing said temporary carrier from the other layers of said assembly; and heating the deposited assembly and article to secure intimate adhesion therebetween whereby the said assembly assumes the texture of said wrinkle surface and becomes substantially integral with said article.

MAURICE AXELROD.

REFERENCES CITED

The following references are of record in the file of this patent:

UNITED STATES PATENTS

| Number | Name | Date |
| --- | --- | --- |
| 748,427 | Sicard | Dec. 29, 1903 |
| 1,732,661 | Root | Oct. 22, 1929 |
| 1,838,368 | Davidson | Dec. 29, 1931 |
| 1,864,763 | Root | June 28, 1932 |
| 1,899,066 | Tonge | Feb. 28, 1933 |
| 1,946,865 | Kubin | Feb. 13, 1934 |
| 2,161,025 | Doolittle | June 6, 1939 |
| 2,231,262 | Fridolph | Feb. 11, 1941 |
| 2,351,933 | Decker et al. | June 20, 1944 |
| 2,409,564 | Heinecke et al. | Oct. 15, 1946 |
| 2,426,462 | Marksberry | Aug. 26, 1947 |